March 8, 1927.                                                                     1,620,204
R. A. HEISING
FREQUENCY INDICATION AND CONTROL
Filed Dec. 29, 1924
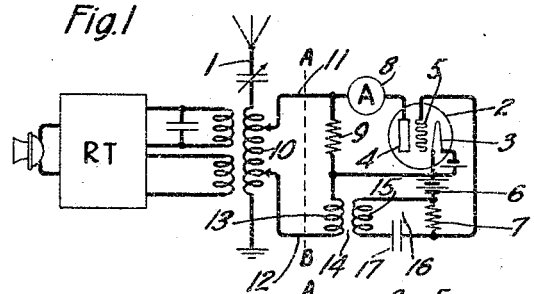
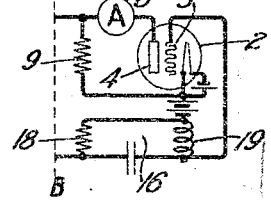
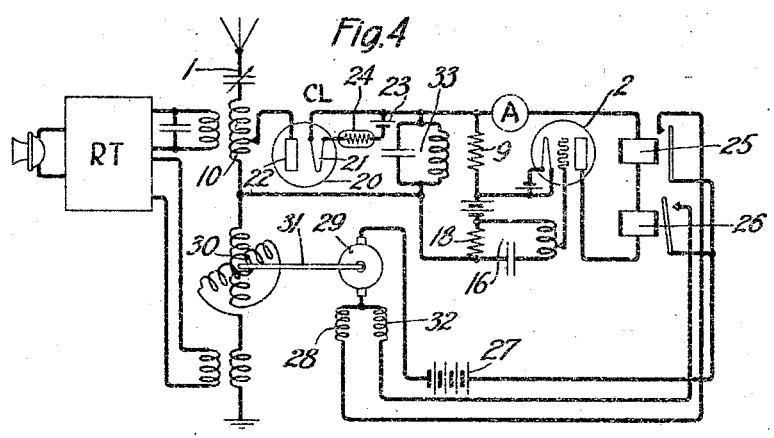
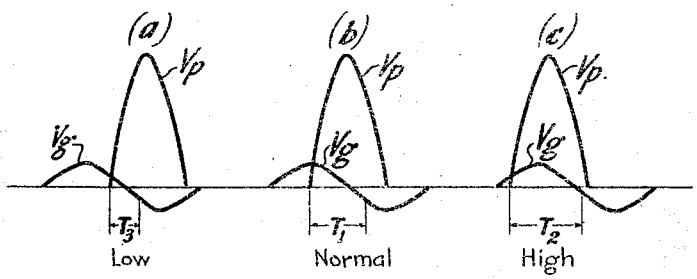
Inventor:
Raymond A. Heising
by E. W. Adams Atty.

Patented Mar. 8, 1927.

1,620,204

UNITED STATES PATENT OFFICE.

RAYMOND A. HEISING, OF MILLBURN, NEW JERSEY, ASSIGNOR TO WESTERN ELECTRIC COMPANY, INCORPORATED, OF NEW YORK, N. Y., A CORPORATION OF NEW YORK.

FREQUENCY INDICATION AND CONTROL.

Application filed December 29, 1924. Serial No. 758,549.

This invention relates to frequency indication and control.

An object of the invention is to provide a method of and means for indicating changes in the frequency of the current generated by any suitable source of alternating current.

A related object is to provide means for controlling the frequency of the current generated by any suitable source of alternating current.

One of the features of the invention resides in the provision of means for maintaining substantially constant the frequency of the transmitted carrier current of a radio transmitting station.

The frequency indicator of the invention comprises a three-electrode space discharge tube which is supplied with plate current from the frequency source to be indicated. The potential applied to the grid of the space discharge tube is also determined in part by current from the frequency source by means of a tuned circuit. In such a system, the amount of current in the plate circuit of the space discharge tube, as indicated by any suitable current measuring instrument, will be determined by the phase difference between the plate and grid potentials of the tube. This phase difference, due to the tuned circuit coupling the frequency source to the grid circuit of the tube, will be directly dependent on the frequency of the source. Therefore, the amount of current in the plate circuit of the space discharge tube will vary directly with changes in the frequency of the source.

This invention may be applied also to the control of the frequency of the current generated by an alternating current source. For example, it might be desired to maintain substantially constant the frequency of the transmitted carrier current in a radio transmitting station. The frequency indicating circuit described generally above, in this case, may be coupled to the transmitting antenna. The current indicating instrument in the plate circuit of the electron discharge tube of the frequency indicating circuit may be replaced by two marginal relays, one adapted to operate for an increase in plate current and, therefore, for an increase in the frequency of the source, and the other for a decrease in the plate current or frequency. These relays may be made to operate a motor in the proper direction to actuate a variometer to readjust the resonant point of the frequency controlling elements in the source.

Other features and advantages of the invention will be brought out in the following detailed description when read in connection with the accompanying drawing, in which—

Fig. 1 is a diagrammatic illustration of a system embodying the invention.

Fig. 2 is a diagrammatic illustration of a modified form of the invention.

Fig. 3 shows curves illustrating the operation of the system of Fig. 1.

Fig. 4 is a modification of the invention adapted for controlling the frequency of a radio transmitting station.

In the system of Fig. 1, the invention is applied to the indication of the frequency of the transmitted carrier current of a radio transmitting station. In this system an antenna circuit 1 is supplied with high frequency oscillations modulated with speech signals by a radio transmitter RT. A circuit for indicating changes in the frequency of the waves supplied to the antenna circuit 1 comprises a space discharge tube 2 of the well known three-electrode type having a cathode or filament 3, an anode or plate 4 and a grid or control element 5. The grid circuit of tube 2 includes in series, the cathode 3, the negative grid battery 6, the resistance 7 and the control electrode 5. The plate circuit of tube 2 includes in series the anode 4, the current indicating or measuring instrument 8, resistance 9 and cathode 3. A portion of the inductance 10 in the antenna circuit 1, is connected by means of conductors 11 and 12 across the resistance 9, in the plate circuit of tube 2, and the primary winding 13 of transformer 14 which are connected in series. The secondary winding 15 of transformer 14 is included in a resonant circuit 16. Besides the secondary winding 15 of transformer 14, the resonant circuit 16 includes also condenser 17 and resistance 7. Resistance 7 couples the resonant circuit 16 to the grid circuit of tube 2.

Fig. 2 illustrates a modification of the frequency indicating circuit shown to the right of the dotted line A—B in Fig. 1. It differs from the circuit shown in Fig. 1 in that a coupling resistance 18 in the resonant circuit 16 is used in place of the coupling transformer 14 and an inductance 19 is used in place of resistance 7 in the tuned circuit 16 for coupling the tuned circuit 16 to the grid circuit of tube 2.

The operation of the system shown in Fig. 1 will now be described. Alternating current of the frequency supplied to the antenna circuit 1 by the radio transmitter RT will flow from the antenna inductance 10 through the resistance 9 and primary winding 13 of transformer 14. The drop in potential in resistance 9 due to the current flowing through it, will determine the potential of plate 4 of tube 2. Therefore, the plate potential will be in phase with the current flowing through resistance 9 and primary coil 13. The potential on grid 5 of tube 2 will also be determined in part by the current flowing through resistance 9 and primary winding 13, as the grid circuit of tube 2 is coupled to the resonant circuit 16 by means of resistance 7 and the coil 15 of tuned circuit 16 is inductively related to coil 13.

The elements in tuned circuit 16 are so chosen that the circuit will be resonant at some particular frequency supplied by the radio transmitter RT. The E. M. F. induced in coil 15 in tuned circuit 16 by the current flowing through coil 13 will be 90° out of phase with respect to that current. If current of the frequency to which circuit 16 is resonant is flowing through coil 13, then the current in circuit 16 will be in phase with the voltage in that circuit and, therefore, also 90° out of phase with the current flowing through coil 13. The current in the tuned circuit 16 flows through resistance 7 and due to the drop in potential in that resistance, an alternating E. M. F. will be applied to the grid 5 of tube 2, which E. M. F. for the resonance condition in tuned circuit 16, will also be 90° out of phase with the current flowing through resistance 9 and coil 13. As stated previously, the potential on plate 4 of tube 2 is in phase with the current flowing through resistance 9 and, therefore, for the resonance condition in tuned circuit 16, there will be a difference of 90° in phase between the plate and grid potentials.

In the case of the modification shown in Fig. 2, alternating current of the frequency supplied by the radio transmitter RT will flow through the resistance 9 in the plate circuit of tube 2 and resistance 18 in the tuned circuit 16. As in the case of Fig. 1, the potential on the plate of tube 2 is determined by the drop in potential in resistance 9 and, therefore, will be in phase with the current flowing through that resistance. The E. M. F. in the tuned circuit 16 is determined by the drop in potential in resistance 18 and, therefore, will be in phase with the current flowing through resistances 9 and 18. As in Fig. 1, the tuned circuit 16 is adjusted to be resonant at some particular frequency supplied by the radio transmitter RT and, for the resonance condition, the current in tuned circuit 16 and flowing through the inductance 19 will be in phase with the driving voltage in that circuit, and, therefore, with the current flowing through resistance 18. As the tuned circuit 16, in this case, is coupled to the grid circuit of tube 2 by the inductance 19, the alternating E. M. F. applied to the grid 5, for the resonance condition in circuit 16, will be 90° out of phase with respect to the current in tuned circuit 16 and, therefore, 90° out of phase with respect to the current flowing through resistances 9 and 18. Therefore, as in the circuit of Fig. 1, there will be a phase difference of 90° between the plate and grid potentials of tube 2 for the resonance condition in tuned circuit 16.

The phase relations between the plate and grid potentials for different frequencies supplied to the frequency indicating circuits of Figs. 1 and 2 are illustrated in the curve shown in Fig. 3. In the curves of Fig. 3 ($a$, $b$ and $c$) the waves $V_p$ and $V_g$ represent instantaneous values of the alternating current potential on the plate and on the grid, respectively, of the space discharge tube 2 under three different conditions to be explained hereinafter. Only the positive halves of the plate potential waves are shown in the drawing. The curves in Fig. 3 ($b$) show the phase relation existing between the plate and grid potentials of space discharge tube 2 when the current received from radio transmitter RT is of the frequency to which the tuned circuit 16 is resonant. As explained above, there will be a phase difference of 90° between the plate and grid potentials for this resonance frequency, as indicated in the curves. Due to that characteristic of a three-electrode space discharge device by virtue of which current can flow from the anode to the cathode only when the anode has impressed thereon a positive potential and when, at the same time, the grid or control electrode has impressed thereon a potential greater than a definite critical value, in the case of the resonance frequency, space current will flow in the tube 2 for a period of time $T_1$ as indicated on the curves ($b$).

Now, if the frequency of the current from the source to be indicated rises above the particular normal value to which tuned circuit 16, in Figs. 1 and 2, is resonant, there will be inductive reactance in that circuit and the current therein will lag with respect to the driving voltage by a phase angle greater than 90°, and the voltage impressed on the grid of tube 2 will lag with respect to the plate voltage by an angle greater than 90°. This condition is shown in the curves (c) of Fig. 3. The current will then flow in the plate circuit of the tube 2 for a period of time $T_2$, as indicated, which period of time is longer than the period $T_1$, corresponding to the resonance frequency, and the current as indicated by the recording instrument 8 in the plate circuit of the tube will be proportionately larger than that indicated for the resonance frequency.

Now, if the frequency of the current from the frequency source to be indicated falls below the frequency to which tuned circuit 16 is resonant, there will be capacity reactance in that circuit and the current therein will lead in phase the driving voltage therein, and the alternating voltage impressed on the grid of the indicator tube will lead the voltage impressed on the plate of that tube. This condition is shown by the curves (a) in Fig. 3. It is evident that in this case space current will flow for a period of time $T_3$, which period is less than that of the period $T_1$, corresponding to the resonance frequency, and the current as indicated by the recording instrument 8 in the plate circuit of tube 2 will be proportionally smaller than that indicated for the resonance frequency.

It is evident, then, that changes in the values of the current as indicated by the current recording instrument in the plate circuit of the space discharge tube of the frequency indicator of the invention will be closely proportional to changes in the frequency of the waves supplied thereto by the source, and may be used to give an indication of the magnitude and direction of the changes in frequency.

If desired, current changes can be reversed in direction with respect to frequency changes by reversing the mutual inductance between coils 13 and 15 or by interchanging the coil 19 and condenser of circuit 16 in Fig. 2.

The indication of changes in frequency by the method described above, will be independent of variations in the voltage of the frequency source, if the space discharge tube is operated with an unsaturated filament. The filament need not be unsaturated if a voltage regulator or a current-limiting device which is independent of frequency, such as illustrated in Fig. 4, is used to regulate the current supplied to the frequency indicator.

In Fig. 4 is shown a modification of the invention adapted for maintaining substantially constant the frequency of the carrier current transmitted by a radio transmitting station. As in Fig. 1, a radio transmitter RT for supplying high frequency oscillations modulated with speech signals to an antenna circuit 1, is shown. The frequency of the transmitted oscillations will be governed by the constants of the transmitting antenna circuit 1. The antenna circuit 1 is connected by means of the coupling inductance 10 with a circuit CL adapted for limiting the amplitude of the current supplied to the frequency control arrangement hereinafter described in case the radio transmitter RT does not produce a constant value of current at all frequencies.

The current limiting circuit CL comprises a space discharge tube 20 of the well known two-electrode type having a cathode or filament 21 and an anode or plate 22. The filament 21 of the tube 20 is supplied with heating current from a battery 23 through a ballast resistance 24, which is provided for the purpose of maintaining the voltage applied to the filament 21 substantially constant. The plate circuit of tube 20 is connected across a portion of the coupling inductance 10 in the antenna circuit 1. A tuned circuit 33 is provided to separate the fundamental component of the distorted current passed by the tube 20 from the harmonics produced in the current-limiting process. It short-circuits the harmonics and rectified current but impresses the fundamental voltage on the frequency control circuit.

The space discharge tube 20 will act as a current-limiting device, since for a given filament temperature, the current which can be made to flow through it is limited by the filament saturation. The amplitude of the alternating current received from the current-limiting circuit CL and delivered to the frequency control arrangement, therefore, will be substantially independent of changes in the voltage of the radio transmitter RT. However, this current will vary in frequency in accordance with variations in the frequency of waves from the radio transmitter RT. As stated previously, a suitable voltage regulator may be used in place of the current-limiting device CL illustrated, or if the indicator tube is operated with an unsaturated filament, changes in the voltage of the frequency source will not materially affect the amplitude of the space current of the indicator tube.

The frequency control arrangement of Fig. 4 differs from the frequency indicating circuit shown in Fig. 2 only in that in addition to the current measuring instrument 8, the two marginal relays 25 and 26 are connected in the plate circuit of tube 2. As explained in connection with the description of the operation of the circuits of Figs. 1 and 2, changes in the current in the plate circuit of tube 2 will be dependent on changes in the frequency of the current supplied by the radio transmitting circuit.

The marginal relay 25 is adapted to be operated for an increase in the current in the plate circuit of tube 2 above the value corresponding to the frequency the resonant circuit 16 is tuned, which is the desired frequency to be transmitted by the antenna circuit 1, and is adapted to remain inoperative for all lower values of current in the plate circuit corresponding to lower frequencies supplied by the frequency source. The marginal relay 26 is adapted to be operated for a decrease in the current in the plate circuit of tube 2 below that value corresponding to the desired frequency to be transmitted by the antenna circuit 1 and to remain inoperative for all higher values of current in the plate circuit corresponding to higher frequencies supplied by the frequency source.

If the frequency of the transmitted oscillations from the radio transmitter RT increases above the normal frequency to which tuned circuit 16 is resonant, it will cause a corresponding increase in the current in the plate circuit of tube 2 in the manner described in connection with Fig. 1, and marginal relay 25 will be operated thereby. The operation of relay 25 will close a circuit through battery 27 and field winding 28 of motor 29 and start motor 29 in a given direction. By means of arm 31 attached to the shaft of motor 29, the variometer 30 will be adjusted in the proper direction to bring the transmitted frequency of the transmitting antenna 1 back to the normal value. When the variometer 30 has been adjusted sufficiently to restore the transmitted frequency of the transmitting antenna to normal, the current in the plate circuit of tube 2, which is dependent on the frequency, will decrease sufficiently so that marginal relay 25 will release, opening the circuit through battery 27 and field winding 28 and stopping the motor 29.

Likewise, if the frequency of the transmitted oscillations from the radio transmitter RT decreases below the normal frequency to which tuned circuit 16 is resonant, it will cause a corresponding decrease in the current in the plate circuit of tube 2, and marginal relay 26 will be operated. The operation of relay 26 will close a circuit through battery 27 and field winding 32 of motor 29 and start motor 29 in the opposite direction to that in the previous case. By means of arm 31 attached to the shaft of motor 29, the variometer 30 in the antenna circuit 1 will then be adjusted in the opposite direction to that in the previous case to bring the transmitted frequency of the transmitting antenna 1 back to the normal value. When the frequency of the transmitting antenna is restored to normal, the current in the plate circuit of tube 2 will increase sufficiently so that the marginal relay 26 releases, opening the circuit through battery 27 and field winding 32 and stopping the motor 29.

The width of the frequency range over which the transmitted frequency can vary without operating the retuning mechanism described above, is dependent upon the sensitivity of the marginal relays 25 and 26. If very sensitive relays are used, the frequency may be controlled within very close limits.

While the invention has been described in connection with a radio transmitting circuit as the source of frequencies to be indicated or controlled, it is to be understood, of course, that it may be used also to indicate or control the frequency of any other source of alternating current waves.

Moreover, the invention is not limited to the particular type of regulating mechanism shown in the drawing, since any other well known form of regulating apparatus which will be responsive to changes in the current of the plate circuit of the indicator tube, may be used for restoring the frequency transmitted by the source of alternating current.

It is obvious that the general principles herein disclosed may be embodied in many other modifications widely different from those illustrated, without departing from the spirit of the invention as defined in the following claims.

What is claimed is:

1. In combination, a source of alternating current waves of varying frequency, and means responsive to changes in the frequency of said waves comprising a space discharge device having a space current circuit and a grid circuit, said space discharge device being supplied with space current from said source, and means to cause the space current in said device to vary in intensity directly in accordance with changes in the frequency of waves from said source, comprising a resonant circuit associated with said source and with said grid circuit.

2. A frequency indicating system comprising a source of waves the frequency of which may change, a space discharge tube associated therewith having a grid circuit and a space current circuit, means to apply to said grid circuit and said space current circuit voltages having a phase difference dependent on changes in the frequency of waves from the source, and means in said space current circuit responsive to changes in the intensity of the current therein.

3. In a system responsive to frequency change, a source of waves the frequency of which may change, a space discharge tube associated therewith having a plate circuit and a grid or control circuit, means to apply to said plate circuit and to said grid circuit voltages having a phase difference proportional to changes in the frequency of said source to set up a space current in said space discharge device of an intensity dependent on said phase difference, and a current responsive means in said plate circuit.

4. A system responsive to frequency change comprising a source of waves whose frequency may change, a space discharge tube comprising a plate circuit and a grid or control circuit, means to supply to said discharge device waves whose change of frequency is to be utilized, whereby voltage variations are impressed on said plate circuit and on said grid circuit having a phase difference which is dependent on the frequency of the waves from said source, to set up in said plate circuit a space current of an intensity dependent on said phase difference, and a current responsive means in said plate circuit.

5. A frequency responsive system comprising a source of waves the change of frequency of which is to be utilized, a space discharge device having a space current circuit and a grid or control circuit, a resonant circuit associated with the grid circuit and tuned to a standard frequency, means to apply to said space current circuit and to said resonant circuit waves whose change of frequency is to be utilized, whereby voltage variations are impressed on said space current circuit and on said grid circuit to set up a space current in said device of an intensity dependent upon the phase angle between the grid and space current circuit voltages, and a current responsive device in said space current circuit.

6. In a frequency indicating system comprising a source of frequencies to be measured, a space discharge tube associated therewith having a space current circuit and a grid or control circuit, means for applying to said grid circuit and to said space current circuit voltages determined by current from said source to set up a space current in said circuit, the space current circuit voltage and the grid circuit voltage having a definite phase relation for one frequency supplied by said source, means to shift the phase of said grid circuit voltage with respect to said space current circuit voltage in accordance with changes in the frequency of the waves from said source, and means in said space current circuit to measure the intensity of the space current therein.

7. In a frequency indicating system comprising a source of alternating current energy the frequency of which is to be measured, an electron discharge device having a plate circuit and a grid circuit, a resonant circuit tuned to a standard frequency, means for impressing a part of the energy from said source on said plate circuit to produce an alternating current potential thereon, and a part of said energy through said resonant circuit on said grid circuit to produce an alternating current potential on said grid circuit which, for energy from said source of said standard frequency, will be 90° out of phase with the potential impressed on said plate circuit, the phase angle between the potentials impressed on said grid circuit and said plate circuit for other frequencies from said source varying in accordance with the frequency, and means in said plate circuit for indicating changes in space current produced in said device by the plate circuit and grid circuit potentials.

8. A system responsive to frequency change comprising a source of alternating current waves the frequency of which is to be utilized, a circuit receiving current from said source, means independent of frequency to limit the amplitude of the current supplied to said circuit, a space discharge tube having a plate circuit and a grid or control circuit, means to couple said plate circuit to the first-mentioned circuit whereby a voltage is impressed on said plate circuit in phase with the current in said first-mentioned circuit, a resonant circuit tuned to a standard frequency, means to couple said resonant circuit to said first-mentioned circuit and to said grid circuit in a manner whereby a voltage will be impressed on said grid circuit differing in phase from the voltage impressed on said plate circuit by an angle of 90° in the case of current of said standard frequency generated by said source and by some other angle directly proportional to the frequency for other frequencies generated by said source, the intensity of the space current produced in said device by the grid and plate voltages being directly proportional to the phase difference between said voltages, and a current responsive means in said plate circuit.

9. In combination, a source of alternating current waves of varying frequency, a circuit supplied with current from said source, a space discharge tube having a space current circuit and a grid circuit, a resistance coupling said space current circuit to the first-mentioned circuit, a resonant circuit tuned to a standard frequency, a resistance in said resonant circuit coupling said resonant circuit to said first-mentioned circuit, an inductance in said resonant circuit coupling said grid circuit to said resonant circuit, and a current responsive device in said space current circuit.

10. In a frequency indicating system comprising a source of alternating current, the frequency of which is to be indicated, means associated therewith to limit the amplitude of said current without changing its frequency, a circuit associated with the current-limiting means to receive current therefrom limited in amplitude but varying in frequency in accordance with said source, a space discharge device having a space current circuit and a control or grid circuit, a resistance coupling the first-mentioned circuit to said space current circuit thereby impressing on said space current circuit a voltage in phase with the current in said first-mentioned circuit, a resonant circuit tuned to a particular frequency, means to couple said resonant circuit to said first-mentioned circuit, and means to couple said resonant circuit to said grid circuit whereby for current flowing in said first-mentioned circuit of said particular frequency, a voltage will be impressed on said grid circuit differing in phase from said current in said first-mentioned circuit by a phase angle of 90°, said voltage impressed on said grid circuit for currents of other frequencies flowing in said first-mentioned circuit differing in phase from said voltage impressed on said space current circuit by phase angles differing from said phase angle of 90° proportionately to the difference between said particular frequency and said other frequencies, and means in said space current circuit to indicate changes in space current therein due to changes in the phase angle between the grid circuit and space current circuit voltages.

11. In a frequency control system, a source of alternating current waves, a resonant circuit associated therewith and arranged to control the frequency thereof, and means to automatically control the adjustment of said resonant circuit comprising a three-electrode space discharge device associated with said resonant circuit and receiving plate current therefrom, a second resonant circuit associated with the first-mentioned resonant circuit and with said space discharge device and tuned to the desired normal frequency of said first-mentioned resonant circuit, said first-mentioned resonant circuit and said second resonant circuit being so associated with said space discharge device as to produce a space current in said device of an intensity directly dependent on the frequency of the current received from said first-mentioned resonant circuit, and means controlled by changes in the amplitude of said space current to maintain the tuning of said first-mentioned resonant circuit substantially constant.

12. In a radio signaling system, the combination with a source of oscillations, of a tuned antenna circuit connected therewith and arranged to govern the frequency thereof, modulating means connected with said source of oscillations, and means to automatically control the adjustment of said tuned antenna circuit, said means comprising a space discharge tube having a plate circuit and a grid circuit, a resonant circuit associated with said grid circuit and tuned to the desired normal frequency to be transmitted by said antenna circuit, means to apply to said plate circuit and said resonant circuit waves from said source of oscillations whereby voltage variations are impressed on said grid circuit and said plate circuit to set up a space current of an intensity dependent upon the phase angle between the grid and plate circuit voltages, and means responsive to changes in the amplitude of said space current to adjust said antenna circuit to maintain the frequency of said source at the desired normal value.

13. In a radio transmitting system, a source of high frequency oscillations modulated in accordance with speech, an antenna circuit coupled to said source to govern the frequency thereof, a circuit connected in shunt to said antenna circuit and receiving current therefrom, a space discharge tube having a plate circuit and a grid circuit, means to couple said plate circuit to the first-mentioned circuit in a manner whereby a voltage in phase with the current in said first-mentioned circuit is impressed on said plate circuit, a resonant circuit tuned to the desired normal frequency of said source, means to couple said resonant circuit to said first-mentioned circuit and to said grid circuit in a manner whereby a voltage is impressed on said grid circuit 90° out of phase with respect to the voltage impressed on said plate circuit when waves of the normal frequency of said antenna circuit are generated by said source, the phase angle between said grid voltage and said plate voltage varying in accordance with frequency when waves of other than said normal frequency are generated by said source, means in said plate circuit responsive to changes in the intensity of the space current produced by the grid and plate voltages, and regulating means operated by said responsive means to adjust said antenna to maintain the frequency of said source at the desired normal value.

14. In a radio signaling system, the combination with a source of oscillations, of a tuned antenna circuit connected therewith and arranged to govern the frequency thereof, modulating means connected with said source of oscillations, and means to automatically control the adjustment of said tuned antenna circuit, said means comprising a space discharge device having a plate circuit and a grid circuit, a resonant circuit associated with said grid circuit and tuned to the desired frequency of said source, means to apply to said plate circuit and said resonant circuit waves from said source of oscillations whereby voltage variations are impressed on said plate circuit and said grid circuit to set up a space current in said plate circuit of an intensity dependent upon the phase angle between the grid and plate circuit voltages, and means controlled by the amplitude of said space current to adjust said antenna to maintain the frequency of said source at the desired normal value.

15. The system of claim 14, in combination with means for limiting the intensity of the waves applied to the plate circuit of the space discharge device and to the resonant circuit to make the intensity of said space current substantially independent of changes in voltage of said source.

In witness whereof, I hereunto subscribe my name this 26th day of December, A. D. 1924.

RAYMOND A. HEISING.